United States Patent
Xiong et al.

(10) Patent No.: US 12,501,317 B2
(45) Date of Patent: Dec. 16, 2025

(54) MESSAGE INTERACTION METHOD AND APPARATUS, AND DEVICE AND STORAGE MEDIUM

(71) Applicant: ZTE CORPORATION, Guangdong (CN)

(72) Inventors: Quan Xiong, Guangdong (CN); Zheng Zhang, Guangdong (CN); Jinghai Yu, Guangdong (CN); Aihua Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 574 days.

(21) Appl. No.: 17/916,082

(22) PCT Filed: Mar. 4, 2021

(86) PCT No.: PCT/CN2021/079032
§ 371 (c)(1),
(2) Date: Sep. 30, 2022

(87) PCT Pub. No.: WO2021/196967
PCT Pub. Date: Oct. 7, 2021

(65) Prior Publication Data
US 2023/0156523 A1   May 18, 2023

(30) Foreign Application Priority Data
Mar. 30, 2020 (CN) .......................... 202010238625.7

(51) Int. Cl.
*H04W 28/00* (2009.01)
*H04W 28/06* (2009.01)
*H04W 28/10* (2009.01)

(52) U.S. Cl.
CPC ........... *H04W 28/10* (2013.01); *H04W 28/06* (2013.01)

(58) Field of Classification Search
None
See application file for complete search history.

(56) References Cited

U.S. PATENT DOCUMENTS 11,159,435 B2 * 10/2021 Kande ..................... H04L 69/40
11,178,592 B2 * 11/2021 Talebi Fard ........ H04W 40/248
(Continued)

FOREIGN PATENT DOCUMENTS

CN   105704529 A   6/2016
CN   110495145 A   11/2019
(Continued)

OTHER PUBLICATIONS

Chinese Supplemental Search Report for Application No. 2020102386257 dated Jan. 26, 2024.
(Continued)

*Primary Examiner* — Gerald A Smarth
(74) *Attorney, Agent, or Firm* — KDW FIRM PLLC

(57) ABSTRACT

Provided are a message interaction method and apparatus, a device, and a storage medium. The method is applied to a first communication node and includes receiving a Time-Sensitive Networking (TSN) configuration message sent by a second communication node, where the TSN configuration message carries flow filtering information and flow mapping information; and performing packet filtering and mapping based on the TSN configuration message.

15 Claims, 5 Drawing Sheets

(56) References Cited

U.S. PATENT DOCUMENTS

| | | | | |
|---|---|---|---|---|
| 11,627,493 | B2* | 4/2023 | Rost | H04L 43/028 |
| | | | | 370/229 |
| 2019/0132150 | A1 | 5/2019 | Arra et al. | |
| 2019/0149629 | A1* | 5/2019 | Wetterwald | H04L 67/5681 |
| | | | | 709/217 |
| 2019/0322299 | A1 | 10/2019 | Mong | |

FOREIGN PATENT DOCUMENTS

| | | | |
|---|---|---|---|
| CN | 110601888 A | 12/2019 | |
| CN | 110650167 A | 1/2020 | |
| CN | 110830352 A | 2/2020 | |
| CN | 110831249 A | 2/2020 | |
| WO | 2011124132 A1 | 10/2011 | |
| WO | 2019166081 A1 | 9/2019 | |
| WO | 2020034861 A1 | 2/2020 | |
| WO | WO-2020035130 A1 * | 2/2020 | H04L 12/1407 |
| WO | WO-2020094210 A1 * | 5/2020 | H04L 1/1887 |

OTHER PUBLICATIONS

Chinese Office Action for Application No. 2020102386257 dated Jan. 31, 2024.
Chinese Search Report for Application No. 20201023867 dated Aug. 7, 2023.
Chinese Office Action for Application No. 20201023687 dated Aug. 10, 2023.
Nokia, Shanghai Bell, "TSN-Qos Framework," SA WG2 Meeting #128-BIS, Aug. 20-24, 2018.
Varga, B., "DetNet Data Plane: IEEE 802.1 Time Sensitive Networking over MPLS", draft-ietf-detnet-tsn-vpn-over-mpls-02, Mar. 6, 2020.
Zhao et al., "Applications and Transmission Technology of 5G Deterministic Network", ZTE Technology Journal 25(5), Oct. 31, 2019 [English Abstract].
International Search Report mailed May 27, 2021, for PCT/CN2021/079032 (five (5) pages).

* cited by examiner

MESSAGE INTERACTION METHOD AND APPARATUS, AND DEVICE AND STORAGE MEDIUM

CROSS-REFERENCE TO RELATED APPLICATIONS

This is a National Stage Application filed under 35 U.S.C. 371 based on International Patent Application No. PCT/CN2021/079032, filed on Mar. 4, 2021, which claims priority to Chinese Patent Application No. 202010238625.7 filed with the China National Intellectual Property Administration (CNIPA) on Mar. 30, 2020, the disclosures of which are incorporated herein by reference in their entireties.

TECHNICAL FIELD

The present application relates to wireless communication networks, for example, a message interaction method and apparatus, a device, and a storage medium.

BACKGROUND

To satisfy service demands of deterministic services, Time-Sensitive Networking (TSN) is defined and mainly provides a Layer 2 (L2) service with services with low latency, a low packet loss rate and high reliability. At the same time, to implement deterministic technology in Layer 3 (L3), Deterministic Networking (DetNet) technology is also proposed. The related technical architecture of the DetNet provides the deterministic services for an L2 bridge and an L3 routing network. However, how TSN related information interacts in the DetNet network is a problem to be solved.

SUMMARY

The present application provides a message interaction method and apparatus, a device, and a storage medium.

An embodiment of the present application provides an information interaction method. The method is applied to a first communication node and includes receiving a Time-Sensitive Networking (TSN) configuration message sent by a second communication node, where the TSN configuration message carries flow filtering information and flow mapping information; and performing packet filtering and mapping based on the TSN configuration message.

An embodiment of the present application provides an information interaction method. The method is applied to a second communication node and includes determining a Time-Sensitive Networking (TSN) configuration message based on a deterministic demand; and sending the TSN configuration message to a first communication node, where the TSN message is used for the first communication node to perform packet filtering and mapping.

An embodiment of the present application provides a message interaction apparatus. The apparatus is configured in a first communication node and includes a receiving module and a filtering and mapping module. The receiving module is configured to receive a Time-Sensitive Networking (TSN) configuration message sent by a second communication node, where the TSN configuration message carries flow filtering information and flow mapping information. The filtering and mapping module is configured to perform packet filtering and mapping based on the TSN configuration message.

An embodiment of the present application provides a message interaction apparatus. The apparatus is configured in a second communication node and includes a configuration module and a sending module. The configuration module is configured to determine a Time-Sensitive Networking (TSN) configuration message based on a deterministic demand. The sending module is configured to send the TSN configuration message to a first communication node, where the TSN message is used for the first communication node to perform packet filtering and mapping.

An embodiment of the present application provides a device. The device includes one or more processors and a memory configured to store one or more programs. The one or more programs, when executed by the one or more processors, cause the one or more processors to perform any message interaction method in embodiments of the present application.

An embodiment of the present application provides a storage medium storing a computer program. The computer program, when executed by a processor, causes the processor to perform any message interaction method in the embodiments of the present application.

The preceding embodiments and other aspects of the present application and implementations thereof are described in more detail in the brief description of drawings, detailed description and claims.

DETAILED DESCRIPTION

Embodiments of the present application are described below in conjunction with drawings.

The steps illustrated in the flowcharts among the drawings may be performed by, for example, a computer system capable of executing a set of computer-executable instructions. Although logical sequences are illustrated in the flowcharts, in some cases, the illustrated or described steps may be performed in sequences different from the sequences described herein.

To satisfy service demands of a deterministic service, the Institute of Electrical and Electronics Engineers (IEEE) 802.1 standard organization defines Time-Sensitive Networking (TSN). The TSN mainly provides a data link layer (Layer 2 (L2)) with services with low latency, a low packet loss rate and high reliability. At the same time, to implement deterministic technology in a network layer (Layer 3 (L3)), the Internet Engineering Task Force (IETF) standard organization also proposed Deterministic Networking (DetNet) technology, and Request For Comments (RFC) 8655 defines the related technical architecture of the DetNet so as to provide the deterministic service for an L2 bridge and an L3 routing network. Quality of Service (QoS) requirements include an upper limit of deterministic latency, a low packet loss rate, reduced jitter, and high reliability.

Figure 1:
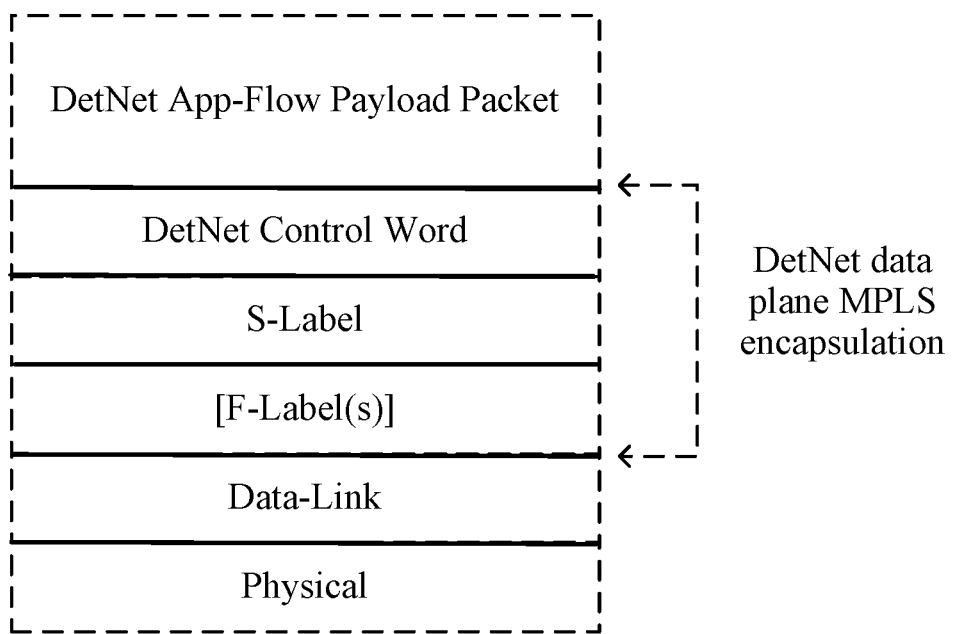
FIG. 1 is a schematic diagram of a packaging manner of a DetNet Multi-Protocol Label Switching (MPLS) forwarding plane.

FIG. 1 is a schematic diagram of a packaging manner of a DetNet MPLS forwarding plane. The IETF DetNet standard draft-ietf-detnet-mpls-04 stipulates that a packaging manner of a DetNet MPLS forwarding plane is shown in FIG. 1. The following three fields are extended in the packaging manner of the DetNet MPLS forwarding plane: a DetNet Control Word, an S-Label and F-Labels.

Figure 2:
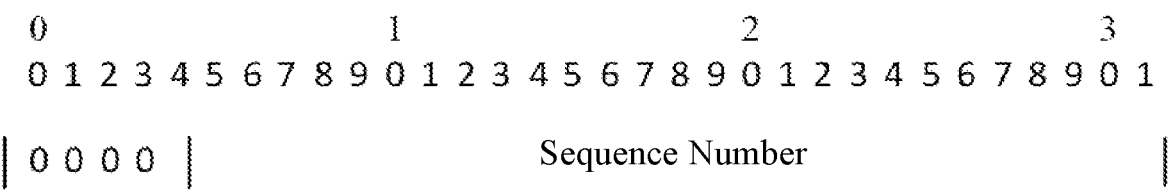
FIG. 2 is a schematic diagram of a format of a DetNet Control Word.

FIG. 2 is a schematic diagram of a format of a DetNet Control Word. The format of the DetNet Control Word is shown in FIG. 2. A sequence number is used for implementing functions of Packet Replication (PR), elimination, and ordering in the DetNet technology. The S-Label is used for identifying a DetNet flow. The F-Labels are used for implementing a deterministic path function in the DetNet technology and implementing the display routing.

Figure 3:
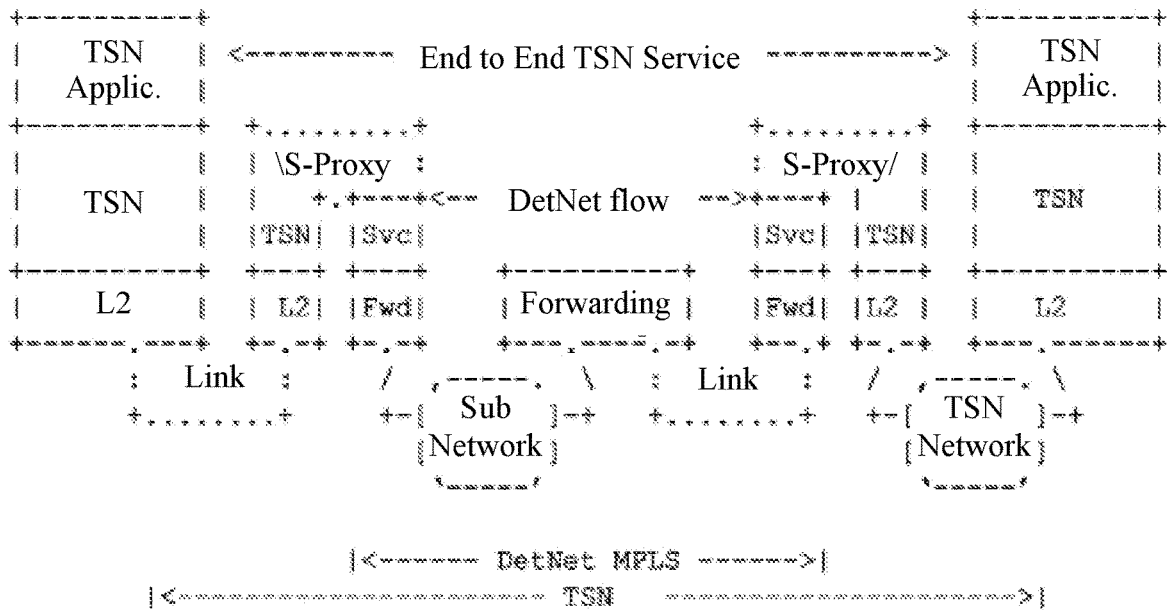
FIG. 3 is a schematic diagram of a TSN over DetNet MPLS scenario.

To solve a scenario where the L3 network implements L2 island connection, draft-ietf-detnet-tsn-vpn-over-mpls-01 introduces the scenario and scheme of TSN over DetNet MPLS, and L3 uses DetNet to implement the deterministic technology and connect the TSN network. FIG. 3 is a schematic diagram of a TSN over DetNet MPLS scenario. As shown in FIG. 3, edge nodes of a DetNet MPLS domain provide identification of a non-DetNet flow (a TSN stream) and have a TSN stream identification function. According to a definition of TSN standard IEEE P802.1CB, the TSN stream is an entity that can provide QoS, is a packet sequence, may be unicast or multicast, and is from one talker to one or more listeners. A TSN Stream IDentification (Stream ID) uniquely identifies one TSN stream, and the length of the TSN Stream ID is 64 bits. The Stream ID is not carried in the packet, but only exists inside a TSN node, and belongs to a control plane identification. The DetNet flow may be identified by a Flow IDentification (Flow-ID) in a DetNet packet. In a DetNet MPLS data plane, the Flow-ID in the DetNet packet is the S-Label in FIG. 1. In the case where the DetNet is based on a Source Route IPv6 (SRv6) data plane, the Flow-ID in the DetNet packet is the Flow-ID.

To implement the connection between the DetNet network and the TSN network, the edge nodes of the DetNet MPLS domain provide a service proxy function, so as to implement the mapping between the TSN stream and the DetNet flow and associate the TSN stream with the DetNet flow, where the TSN stream may be in a one-to-one correspondence with the DetNet flow, or multiple TSN streams may be mapped to one DetNet flow. TSN related information, such as stream processing demands, priorities, queue operations and other attributes, needs to be advertised to the DetNet network, the TSN Stream ID and related parameters and demands need to be converted into the DetNet Flow-ID and related parameters and demands, and flow identification rules and flow mapping of the TSN stream and the DetNet flow need to be implemented by a control plane method.

However, the standard lacks an interaction function of the TSN related information in the DetNet deterministic technology that needs to be implemented by the relevant control plane.

Figure 4:
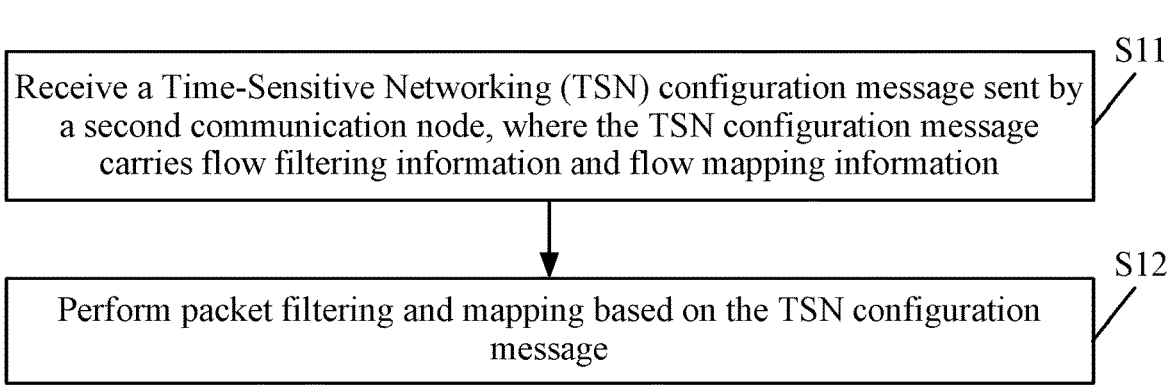
FIG. 4 is a flowchart of a message interaction method according to an embodiment of the present application.

In an exemplary implementation, FIG. 4 is a flowchart of a message interaction method according to an embodiment of the present application. This embodiment may be applied to a case where information interaction between the DetNet network and the TSN network is performed. This method may be performed by a first communication node provided by the embodiment of the present application. A message interaction apparatus of the first communication node may be implemented by software and/or hardware.

As shown in FIG. 4, the message interaction method provided by the embodiment of the present application mainly includes S11 and S12.

In S11, a Time-Sensitive Networking (TSN) configuration message sent by a second communication node is received, where the TSN configuration message carries flow filtering information and flow mapping information.

In S12, packet filtering and mapping are performed based on the TSN configuration message.

In an exemplary implementation, the first communication node is an ingress edge node of a Deterministic Networking (DetNet) domain, or the first communication node is an egress edge node of a DetNet domain.

In an exemplary implementation, in the case where the first communication node is an ingress edge node, the flow filtering information includes a Media Access Control (MAC) Address mask, where the MAC mask is used for identifying and filtering a TSN stream.

In an exemplary implementation, in the case where the first communication node is an ingress edge node, the flow mapping information includes a DetNet Flow IDentification (Flow-ID), where the DetNet Flow-ID uniquely identifies one DetNet flow and is used for identifying the DetNet flow.

In an exemplary implementation, in the case where the first communication node is an ingress edge node, the flow mapping information includes a packet sequence number, where the packet sequence number is carried in the case where a set instruction is in a preset state, and the packet sequence number uniquely identifies one DetNet packet and is used for functions of DetNet packet replication and elimination.

In an exemplary implementation, in the case where the first communication node is an ingress edge node, performing the packet filtering and mapping based on the TSN configuration message includes identifying and filtering a TSN packet based on an MAC mask; and mapping the TSN packet to a corresponding DetNet flow based on the flow mapping information.

In an exemplary implementation, in the case where the first communication node is an egress edge node, the flow filtering information includes a DetNet Flow-ID, where the DetNet Flow-ID in the flow filtering information is used for filtering a DetNet flow.

In an exemplary implementation, in the case where the first communication node is an egress edge node, the flow mapping information includes one or more of the following: a TSN profile type; a TSN profile length; or a TSN profile, where the TSN profile is used for carrying TSN information.

In an exemplary implementation, in the case where the first communication node is an egress edge node, performing the packet filtering and mapping based on the TSN configuration message includes identifying and filtering a DetNet packet based on a DetNet Flow-ID in the flow filtering information; and mapping the filtered DetNet packet to a corresponding TSN stream and a corresponding TSN profile based on the flow mapping information.

Figure 5:
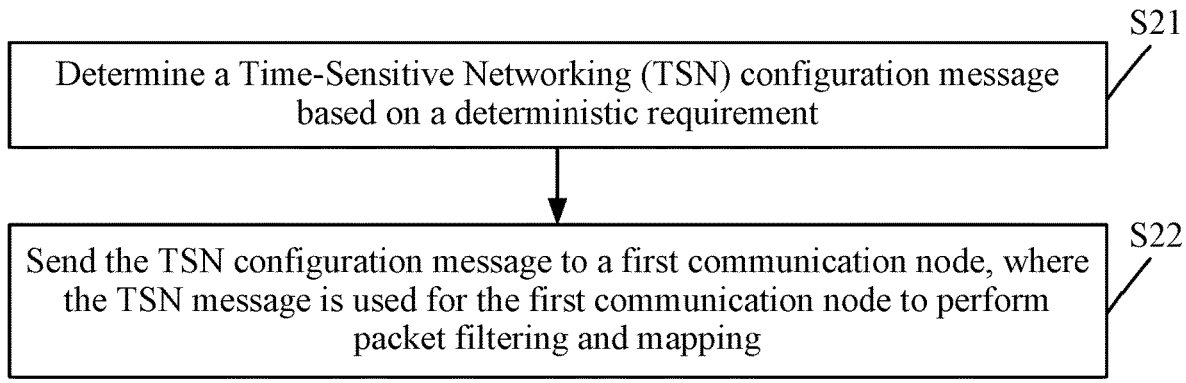
FIG. 5 is a flowchart of another message interaction method according to an embodiment of the present application.

In an exemplary implementation, FIG. 5 is a flowchart of another message interaction method according to an embodiment of the present application. This embodiment may be applied to a case where information interaction between the DetNet network and the TSN network is performed. This method may be performed by a second communication node provided by the embodiment of the present application. An information interaction apparatus of the second communication node may be implemented by software and/or hardware.

As shown in FIG. 5, the message interaction method provided by the embodiment of the present application mainly includes S21 and S22.

In S21, a Time-Sensitive Networking (TSN) configuration message is determined based on a deterministic demand.

In S22, the TSN configuration message is sent to a first communication node, where the TSN message is used for the first communication node to perform packet filtering and mapping.

In an exemplary implementation, a protocol type of the TSN configuration message includes one or more of the following: in the case where a Border Gateway Protocol (BGP) flow is configured, the protocol type of the TSN configuration message is a BGP; or in the case where a Path Computation Element Protocol (PCEP) flow is configured, the protocol type of the TSN configuration message is a PCEP.

In an exemplary implementation, in the case where the first communication node is an ingress edge node, flow filtering information includes a Media Access Control (MAC) mask; and flow mapping information includes a DetNet Flow IDentification (Flow-ID) and a packet sequence number.

In an exemplary implementation, in the case where the first communication node is an egress edge node, flow filtering information includes a DetNet Flow-ID and flow mapping information includes one or more of the following: a TSN profile type; a TSN profile length; or a TSN profile.

In an application example, an interaction method of edge nodes is provided.

To implement functions of flow identification and mapping in the DetNet network, a control plane configuration manner may be adopted, such as a Border Gateway Protocol (BGP) and a Path Computation Element Protocol (PCEP) proposed by the IETF standard. RFC4271 proposes that the BGP implements the interaction of routing information and the like. The advertisement of the routing information uses an UPDATE message, where the UPDATE message carries Network Layer Reachability Information (NLRI) for indicating routing destination information.

On this basis, draft-ietf-idr-rfc5575bis proposes a function of BGP Flow Specification (Flowspec) and a new type of NLRI, where the NLRI is used for traffic distribution, filtering and forwarding rules. IETF standard draft-ietf-idr-flowspec-12vpn-13 defines filtering and forwarding rules of Ethernet traffic. At the same time, based on BGP Flowspec, draft-ietf-pce-pcep-flowspec-07 proposes PCEP Flowspec used for the configuration from traffic to a corresponding path.

To implement the interaction function of TSN related information in the DetNet network, this embodiment proposes that the identification and mapping of the TSN stream and the DetNet flow and advertisement of related information are completed by a control plane BGP/PCEP Flowspec method according to the definition of the filtering and forwarding rules of the DetNet flow/TSN stream so as to implement the information interaction between the DetNet and the TSN.

First, at the ingress edge node of the DetNet domain, the BGP/PCEP needs to be used for issuing TSN identification, mapping and route advertisement. According to the TSN stream identification methods of the TSN standard IEEE802.1CB and IEEE802.1CBdb, five types of stream identification functions are defined, including empty stream identification, a source Media Access Control Address (MAC Address)/Virtual Local Area Network (VLAN) stream identification, destination MAC/VLAN stream identification, Internet Protocol (IP) stream identification, and mask matching stream identification.

In the first four stream identification manners described above, a combination of a source MAC address, a destination MAC address, and a Virtual Local Area Network Identification (VLAN ID) in the Ethernet packet is mainly used for identifying the TSN stream. On the basis that these four filtering rules of the BGP Flowspec have been defined in draft-ietf-idr-flowspec-12vpn-13, the TSN stream filtering rules may be used directly. However, in the fifth manner, that is, the mask matching stream identification, a combination identification manner of source MAC, destination MAC, a VLAN ID, and mask mac_service_data_unit is adopted, but such mask filtering rule does not exist in the standard. Therefore, in this embodiment, the BGP Flowspec and PCEP Flowspec are extended, and an L2 Component type and a Type Length Value (TLV) are newly added. The BGP Flowspec L2 Component mask filtering type and format are described below.

Type TBD1—mac_service_data_unit

Encoding: <type (1 octet), length (1 octet), mac_service_data_unit>

An MAC_SERVICE_DATA_UINIT TLV format after the PCEP Flowspec is extended is described below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Type = [TBD1]          |          Length = 8           |
+-+-+-+-+-+-+-+-+-+-+-+-+-+-+-+-+-+-+-+-+-+-+-+-+-+-+-+-+-+-+-+-+
|                     mac_service_data_unit                     |
+-+-+-+-+-+-+-+-+-+-+-+-+-+-+-+-+-+-+-+-+-+-+-+-+-+-+-+-+-+-+-+-+
|        mac_service_data_unit  |              Resv             |
+-+-+-+-+-+-+-+-+-+-+-+-+-+-+-+-+-+-+-+-+-+-+-+-+-+-+-+-+-+-+-+-+
```

A length of mac_service_data_unit is 48 bits, and the content is the MAC mask. Some or all of the fields may be used for identifying and filtering the TSN stream.

To implement the mapping between the TSN stream and the DetNet flow, this application proposes a stream mapping operation after the TSN stream filtering, and the DetNet-action is extended based on L2 Traffic Actions. A BGP Flowspec DetNet-action format is described below.

```
0                                                              15
+---+---+---+---+---+---+---+---+---+---+---+---++---+---+---+---+---+

S|                          Resv                                 |
+---+---+---+---+---+---+---+---+---+---+---+---++---+---+---+---+---+

|                         Flow-ID                                |
|                            ~                                   |
+---+---+---+---+---+---+---+---+---+---+---+---++---+---+---+---+---+

|                         Sequence                               |
|                            ~                                   |
+---+---+---+---+---+---+---+---+---+---+---+---++---+---+---+---+---+.
```

In the case where a set instruction S is set to 1, it indicates that the TSN stream is mapped to a sequence of the DetNet flow.

The Flow-ID is 20 or 32 bits in length and is used for uniquely identifying one DetNet flow.

The Sequence is 16 or 28 bits in length and is used for identifying one DetNet packet.

At the egress edge node of the DetNet domain, the BGP/PCEP needs to be used for issuing the DetNet flow identification and a TSN stream information advertisement. Therefore, in this embodiment, the BGP/PCEP Flowspec is extended, and an L3 Component type and a TLV are newly added. The filtering type and format of a BGP Flowspec L3 Component Flow-ID are described below.

Type TBD2—Flow-ID

Encoding: <type (1 octet), length (1 octet), Flow-ID>

A FLOW_ID TLV format after the PCEP Flowspec is extended is described below.

```
   0                   1                   2                   3
   0 1 2 3 4 5 6 7 8 9 0 1 2 3 4 5 6 7 8 9 0 1 2 3 4 5 6 7 8 9 0 1
  +-+-+-+-+-+-+-+-+-+-+-+-+-+-+-+-+-+-+-+-+-+-+-+-+-+-+-+-+-+-+-+-+
  |        Type = [TBD2]         |         Length = 4             |
  +-+-+-+-+-+-+-+-+-+-+-+-+-+-+-+-+-+-+-+-+-+-+-+-+-+-+-+-+-+-+-+-+
  |                          Flow-ID                              |
  +-+-+-+-+-+-+-+-+-+-+-+-+-+-+-+-+-+-+-+-+-+-+-+-+-+-+-+-+-+-+-+-+
```

The Flow-ID is 20 or 32 bits in length and is used for uniquely identifying one DetNet flow.

To implement the mapping between the TSN stream and the DetNet flow, this application proposes an operation of mapping and restoring the DetNet flow to the TSN stream after the DetNet flow filtering, and the TSN-action is extended based on L3 Traffic Actions. A BGP Flowspec TSN-action format is described below.

```
0                                                              15
+---+---+---+---+---+---+---+---+---+---+---+---+---+---+---+---+
|         Type              |            Length                  |
+---+---+---+---+---+---+---+---+---+---+---+---+---+---+---+---+
|                        TSN-Profile                             |
+---+---+---+---+---+---+---+---+---+---+---+---+---+---+---+---+
```

The Type is 8 bits in length and is used for indicating a TSN profile type.

The TSN profile type includes, but is not limited to, the TSN profile definition in the related art. The TSN profile in the related art is defined below.

In the case where Type=1, P802.1CM-2018 is for Time-Sensitive Networking for Fronthaul.

In the case where Type=2, IEC/IEEE 60802 is for a TSN Profile for Industrial Automation.

In the case where Type=3, P802.1DC is for Quality of Service Provision by Network Systems.

In the case where Type=4, P802.1DF is for a TSN Profile for Service Provider Networks.

In the case where Type=5, P802.1DG is for a TSN Profile for Automotive In-Vehicle Ethernet Communications.

In the case where Type=6, P802.1CMde is for Enhancements to Fronthaul Profiles to Support New Fronthaul Interface, Synchronization, and Synchronization Standards.

The Length is 8 bits in length and is used for indicating the length of a TSN-Profile.

The length of the TSN-Profile is variable and is used for carrying the TSN information. The Type and the corresponding TSN-Profile include, but are not limited to, IEEE802.1 TSN, related standards defined in the future by IEEE802.1 TSN, and a combination thereof.

This embodiment is applicable to various networks such as the DetNet IP, MPLS, and SRv6. However, the DetNet Flow-ID is not extended in the packet in the DetNet IP network. Therefore, after the TSN stream is identified at the ingress edge node, the TSN stream is not mapped to the DetNet Flow-ID, but mapped to a 6-tuple field of an IP packet header (IP 6-tuple) according to the existing IP routing method. At the egress edge node, the TSN stream is not identified by the DetNet Flow-ID, but is filtered by the IP 6-tuple manner, and then mapped to the TSN stream and the TSN profile.

In an application example, this embodiment proposes a method for TSN related information interaction in the DetNet network. This embodiment proposes that the mapping between the TSN stream and the DetNet flow and the advertisement of related information are completed by the control plane BGP/PCEP Flowspec method according to the definition of the filtering rules and operations of the TSN stream so as to implement the interaction between the DetNet and the TSN. An interaction process between the DetNet and the TSN provided by the embodiments of the present application mainly includes processes described below.

A controller issues a configuration message to the ingress edge node and the egress edge node of the DetNet, where the configuration message carries the flow filtering rules and mapping operations proposed in the present application, and message types include the BGP or the PCEP.

The ingress edge node of the DetNet receives and filters the TSN packet according to the message configuration and maps the TSN packet to the DetNet flow.

The egress edge node of the DetNet receives and filters the DetNet packet according to the message configuration and maps the DetNet packet to the TSN stream and the TSN profile of the TSN stream.

Figure 6:
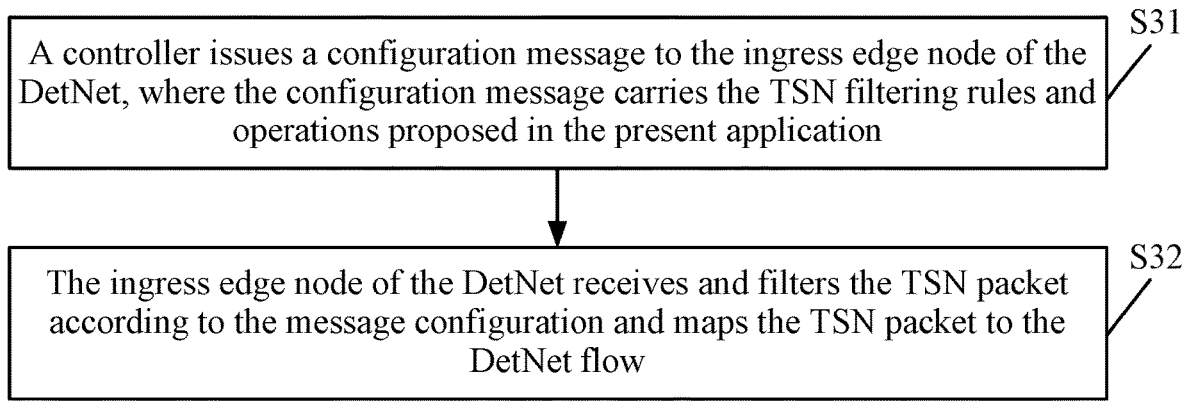
FIG. 6 is a flowchart of message processing of an ingress edge node according to an embodiment of the present application.

FIG. 6 is a flowchart of message processing of an ingress edge node according to an embodiment of the present application. As shown in FIG. 6, a message processing flow of the ingress edge node mainly includes the following.

In S31, a controller issues a configuration message to the ingress edge node of the DetNet, where the configuration message carries the TSN filtering rules and operations proposed in the present application.

In S32, the ingress edge node of the DetNet receives and filters the TSN packet according to the message configuration and maps the TSN packet to the DetNet flow.

Figure 7:
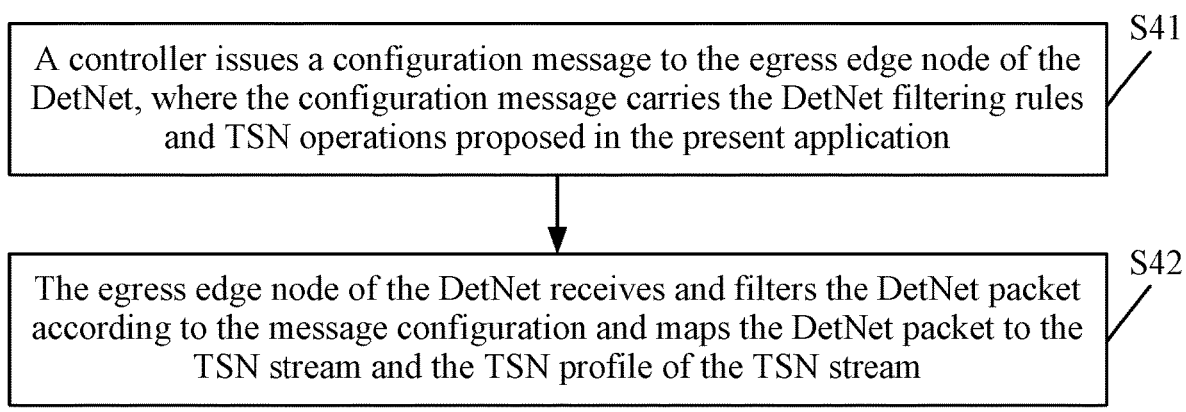
FIG. 7 is a flowchart of message processing of an egress edge node according to an embodiment of the present application.

FIG. 7 is a flowchart of message processing of an egress edge node according to an embodiment of the present application. As shown in FIG. 7, a message processing flow of the egress edge node mainly includes the following.

In S41, a controller issues a configuration message to the egress edge node of the DetNet, where the configuration message carries the DetNet filtering rules and TSN operations proposed in the present application.

In S42, the egress edge node of the DetNet receives and filters the DetNet packet according to the message configuration and maps the DetNet packet to the TSN stream and the TSN profile of the TSN stream.

In an application implementation, this embodiment provides an application manner of the preceding message interaction method in a TSN over DetNet MPLS network.

Figure 8:
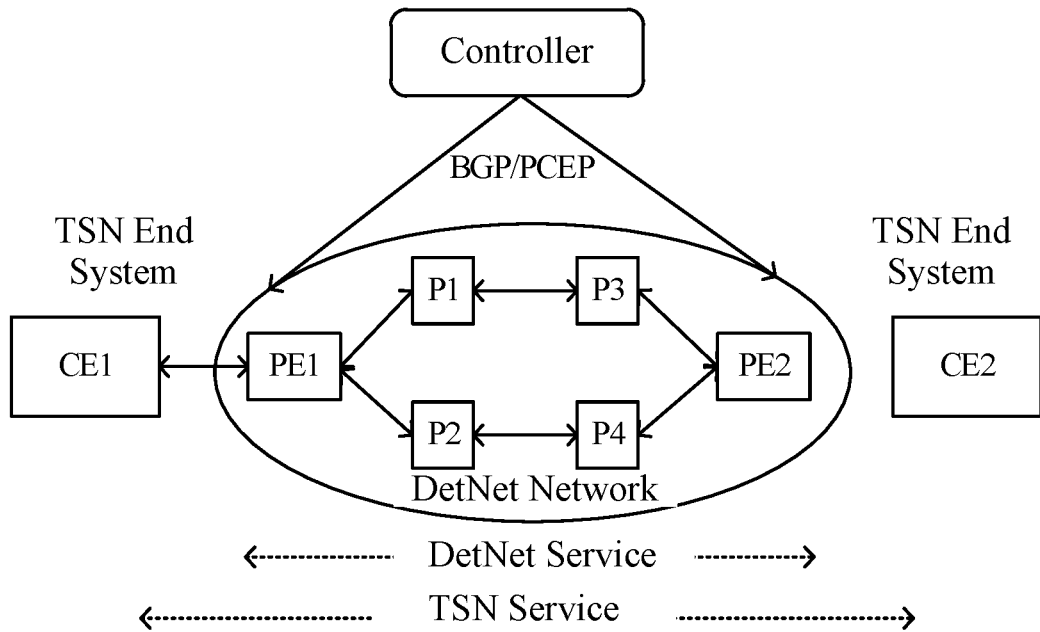
FIG. 8 is a structural diagram of a TSN over DetNet network according to an embodiment of the present application.

FIG. 8 is a structural diagram of a TSN over DetNet network according to an embodiment of the present application. As shown in FIG. 8, L2 TSN terminal nodes CE1 and CE2 need to be connected through the DetNet network, and the TSN stream is sent from CE1 to PE1 and needs to be mapped into the DetNet flow; at a PE2 node, the DetNet flow is restored to the TSN stream, and the TSN stream is forwarded to CE2. This embodiment proposes a TSN related information advertisement function in the DetNet network. This embodiment proposes that the mapping between the TSN stream and the DetNet flow and the advertisement of related information are completed by the control plane BGP/PCEP Flowspec method according to the definition of the filtering rules and operations of the TSN stream so as to implement the interaction between the DetNet and the TSN.

In the case where the DetNet domain is an MPLS network, the process is described below.

The controller issues a configuration message to PE1 and PE2 nodes, where the configuration message carries the flow filtering rules and mapping operations proposed in the present application, and the TSN stream filtering, identification and forwarding configuration of the PE1 node are completed and the DetNet flow identification, filtering and forwarding configuration of the PE2 node are completed.

CE1 sends the TSN stream to the PE1 node. After receiving the TSN packet, the PE1 node receives and filters the TSN packet according to the control plane configuration and maps the TSN packet to the corresponding DetNet flow, that is, the TSN packet is mapped to an S-label of the DetNet MPLS and forwarded to the PE2 node through the DetNet MPLS.

After receiving the packet, the PE2 node receives and filters the DetNet packet according to the control plane configuration, maps the DetNet packet to the TSN stream and the TSN profile of the TSN stream, and forwards the TSN stream to CE2.

In an application implementation, this embodiment provides an application manner of the preceding message interaction method in a TSN over DetNet SRv6 network.

FIG. 8 is a structural diagram of a TSN over DetNet network. As shown in FIG. 8, L2 TSN terminal nodes CE1 and CE2 need to be connected through the DetNet network, and the TSN stream is sent from CE1 to PE1 and needs to be mapped into the DetNet flow; at a PE2 node, the DetNet flow is restored to the TSN stream, and the TSN stream is forwarded to CE2. This embodiment proposes a TSN related information advertisement function in the DetNet network. This embodiment proposes that the mapping between the TSN stream and the DetNet flow and the advertisement of related information are completed by the control plane BGP/PCEP Flowspec method according to the definition of the filtering rules and operations of the TSN stream so as to implement the interaction between the DetNet and the TSN.

In the case where the DetNet domain is an SRv6 network, the process is described below.

The controller issues a configuration message to PE1 and PE2 nodes, where the configuration message carries the flow filtering rules and mapping operations proposed in the present application, and the TSN stream filtering, identification and forwarding configuration of the PE1 node are completed and the DetNet flow identification, filtering and forwarding configuration of the PE2 node are completed.

CE1 sends the TSN stream to the PE1 node. After receiving the TSN packet, the PE1 node receives and filters the TSN packet according to the control plane configuration and maps the TSN packet to the corresponding DetNet flow, that is, the TSN packet is mapped to a Flow-ID of the DetNet SRv6 and forwarded to the PE2 node through the DetNet MPLS.

After receiving the packet, the PE2 node receives and filters the DetNet packet according to the control plane configuration, maps the DetNet packet to the TSN stream and the TSN profile of the TSN stream, and forwards the TSN stream to CE2.

Figure 9:
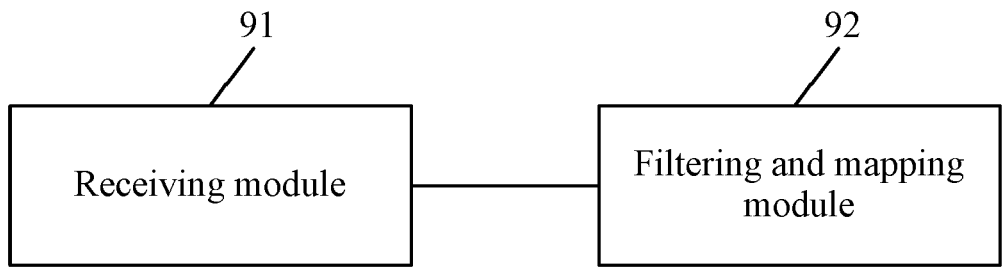
FIG. 9 is a schematic diagram of a message interaction apparatus according to an embodiment of the present application.

In an exemplary implementation, FIG. 9 is a schematic diagram of a message interaction apparatus according to an embodiment of the present application. This embodiment may be applied to a case where information interaction between the DetNet network and the TSN network is performed. This apparatus is configured in a first communication node. The message interaction apparatus of the first communication node may be implemented by software and/or hardware.

As shown in FIG. 9, the message interaction apparatus provided in the embodiment of the present application mainly includes a receiving module 91 and a filtering and mapping module 92.

The receiving module 91 is configured to receive a Time-Sensitive Networking (TSN) configuration message sent by a second communication node, where the TSN configuration message carries flow filtering information and flow mapping information.

The filtering and mapping module 92 is configured to perform packet filtering and mapping based on the TSN configuration message.

In an exemplary implementation, the first communication node is an ingress edge node of a Deterministic Networking (DetNet) domain, or the first communication node is an egress edge node of a DetNet domain.

In an exemplary implementation, in the case where the first communication node is an ingress edge node, the flow filtering information includes a Media Access Control (MAC) mask, where the MAC mask is used for identifying and filtering a TSN stream.

In an exemplary implementation, in the case where the first communication node is an ingress edge node, the flow mapping information includes a DetNet Flow IDentification (Flow-ID), where the DetNet Flow-ID uniquely identifies one DetNet flow and is used for identifying the DetNet flow.

In an exemplary implementation, in the case where the first communication node is an ingress edge node, the flow mapping information includes a packet sequence number, where the packet sequence number is carried in the case where a set instruction is in a preset state, and the packet sequence number uniquely identifies one DetNet packet and is used for functions of DetNet packet replication and elimination.

In an exemplary implementation, in the case where the first communication node is an ingress edge node, the filtering and mapping module 92 is configured to identify and filter a TSN packet based on an MAC mask and map the TSN packet to a corresponding DetNet flow based on the flow mapping information.

In an exemplary implementation, in the case where the first communication node is an egress edge node, the flow filtering information includes a DetNet Flow-ID, where the DetNet Flow-ID in the flow filtering information is used for filtering a DetNet flow.

In an exemplary implementation, in the case where the first communication node is an egress edge node, the flow mapping information includes one or more of the following: a TSN profile type; a TSN profile length; or a TSN profile, where the TSN profile is used for carrying TSN information.

In an exemplary implementation, in the case where the first communication node is an egress edge node, the filtering and mapping module 92 is configured to identify and filter a DetNet packet based on a DetNet Flow-ID in the flow filtering information and map the filtered DetNet packet to a corresponding TSN stream and a corresponding TSN profile based on the flow mapping information.

The message interaction apparatus provided in this embodiment may perform the message interaction method provided in any embodiment of the present application and has functional modules corresponding to the executed method. For technical details not described in detail in this embodiment, reference may be made to the message interaction method provided in any embodiment of the present application.

It is to be noted that units and modules involved in the embodiment of the message interaction apparatus are just divided according to functional logic, and the division is not limited to this, as long as the corresponding functions can be achieved; the names of functional units are just intended for distinguishing and are not to limit the scope of the present application.

Figure 10:
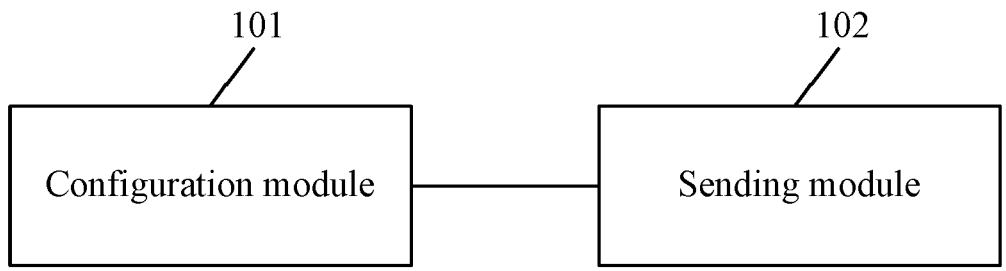
FIG. 10 is a schematic diagram of another message interaction apparatus according to an embodiment of the present application.

In an exemplary implementation, FIG. 10 is a schematic diagram of another message interaction apparatus according to an embodiment of the present application. This embodiment may be applied to a case where information interaction between the DetNet network and the TSN network is performed. This apparatus is configured in a second communication node. The message interaction apparatus of the second communication node may be implemented by software and/or hardware.

As shown in FIG. 10, the message interaction apparatus provided in the embodiment of the present application mainly includes a configuration module 101 and a sending module 102.

The configuration module 101 is configured to determine a Time-Sensitive Networking (TSN) configuration message based on a deterministic demand.

The sending module 102 is configured to send the TSN configuration message to a first communication node, where the TSN message is used for the first communication node to perform packet filtering and mapping.

In an exemplary implementation, a protocol type of the TSN configuration message includes one or more of the following: in the case where a Border Gateway Protocol (BGP) flow is configured, the protocol type of the TSN configuration message is a BGP; or in the case where a Path Computation Element Protocol (PCEP) flow is configured, the protocol type of the TSN configuration message is a PCEP.

In an exemplary implementation, in the case where the first communication node is an ingress edge node, flow filtering information includes a Media Access Control (MAC) mask; and flow mapping information includes a DetNet Flow IDentification (Flow-ID) and a packet sequence number.

In an exemplary implementation, in the case where the first communication node is an egress edge node, flow filtering information includes a DetNet Flow-ID and flow mapping information includes one or more of the following: a TSN profile type; a TSN profile length; or a TSN profile.

The message interaction apparatus provided in this embodiment may perform the message interaction method provided in any embodiment of the present application and has functional modules corresponding to the executed method. For technical details not described in detail in this embodiment, reference may be made to the message interaction method provided in any embodiment of the present application.

It is to be noted that units and modules involved in the embodiment of the message interaction apparatus are just divided according to functional logic, and the division is not limited to this, as long as the corresponding functions can be achieved; the names of functional units are just intended for distinguishing and are not to limit the scope of the present application.

Figure 11:
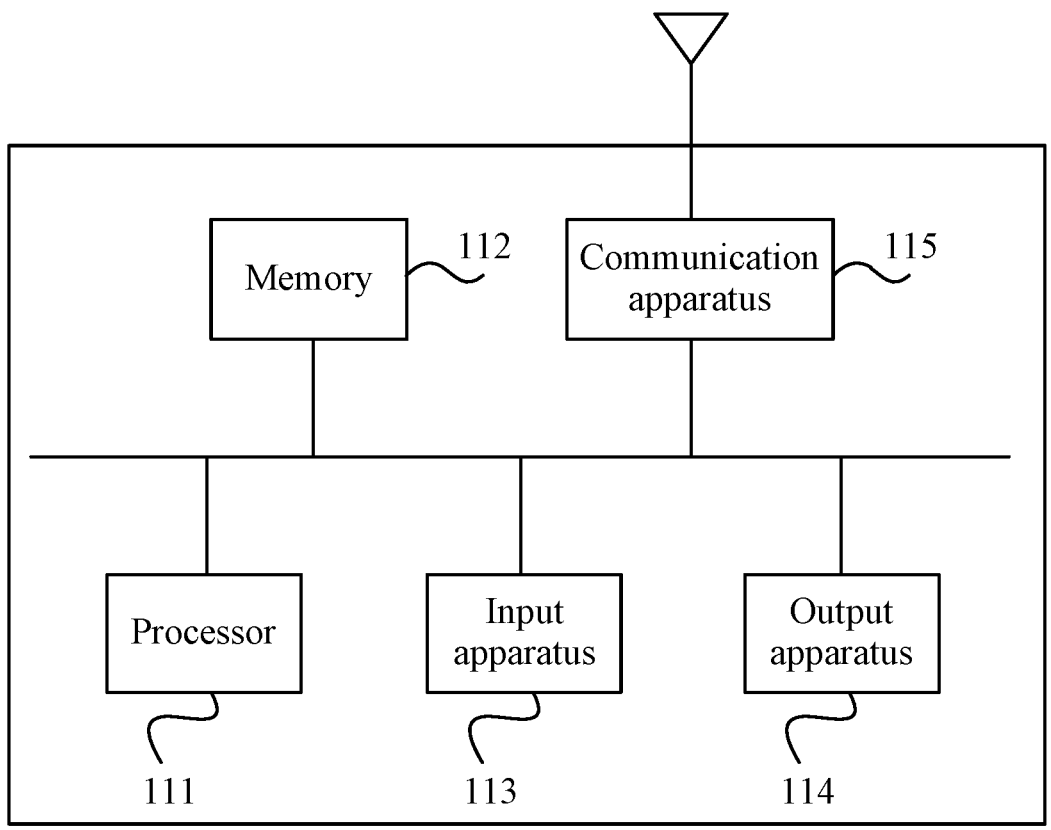
FIG. 11 is a structural diagram of a device according to an embodiment of the present application.

An embodiment of the present application further provides a device. FIG. 11 is a structural diagram of a device according to an embodiment of the present application. As shown in FIG. 11, the device includes a processor 111, a memory 112, an input apparatus 113, an output apparatus 114, and a communication apparatus 115. One or more processors 111 may be provided in the device. One processor 111 is used as an example in FIG. 11. The processor 111, the memory 112, the input apparatus 113, and the output apparatus 114 in the device may be connected through a bus or in other manners. In FIG. 11, connection through a bus is performed by way of example.

As a computer-readable storage medium, the memory 112 may be configured to store software programs, computer-executable programs, and modules, for example, program instructions/modules (for example, the receiving module 91 and the filtering and mapping module 92 in the message interaction apparatus) corresponding to the message interaction method according to any embodiment of the present application and program instructions/modules (for example, the configuration module 101 and the sending module 102 in the message interaction apparatus) corresponding to the message interaction method according to any embodiment of the present application. The processor 111 executes software programs, instructions, and modules stored in the memory 112 to perform various function applications and data processing of the device, that is, to implement any message interaction method according to the embodiments of the present application.

The memory 112 may mainly include a program storage region and a data storage region, where the program storage region may store an operating system and an application program required by at least one function while the data storage region may store data created depending on use of a device. The memory 112 may include a high-speed random-access memory and may also include a non-volatile memory, such as at least one magnetic disk memory, a flash memory, or another nonvolatile solid-state memory. In some examples, the memory 112 may include memories which are remotely disposed relative to the processor 111, and these remote memories may be connected to the device via a network. Examples of the preceding network include, but are not limited to, the Internet, an intranet, a local area network, a mobile communication network, and a combination thereof.

The input apparatus 113 may be configured to receive inputted digital or character information and generate key signal input related to user settings and function control of the device. The output apparatus 114 may include display devices such as a display screen.

The communication apparatus 115 may include a receiver and a transmitter. The communication apparatus 115 is configured to perform information transceiving and communication under the control of the processor 111.

In the case where the device is a first communication node, the processor 111 executes programs stored in the memory 112 in the system to perform various function applications and data processing, that is, to implement the message interaction method provided in the embodiments of the present application. The method includes receiving a Time-Sensitive Networking (TSN) configuration message sent by a second communication node, where the TSN configuration message carries flow filtering information and flow mapping information; and performing packet filtering and mapping based on the TSN configuration message.

Those skilled in the art can understand that the processor 111 may also implement the technical schemes of the message interaction method according to any embodiment of the present application. For the hardware structure and function of the device, reference may be made to the content explanation of this embodiment.

In the case where the device is a second communication node, the processor 111 executes programs stored in the memory 112 in the system to perform various function applications and data processing, that is, to implement the message interaction method provided in the embodiments of the present application. The method includes determining a Time-Sensitive Networking (TSN) configuration message based on a deterministic demand; and sending the TSN configuration message to a first communication node, where the TSN message is used for the first communication node to perform packet filtering and mapping.

Those skilled in the art can understand that the processor 610 may also implement the technical schemes of the message interaction method according to any embodiment of the present application. For the hardware structure and function of the device, reference may be made to the content explanation of this embodiment.

In an exemplary implementation, an embodiment of the present application further provides a storage medium including a computer-executable instruction. When the computer-executable instruction is executed by a computer processor, a message interaction method applied to a first communication node is performed. The method includes receiving a Time-Sensitive Networking (TSN) configuration message sent by a second communication node, where the TSN configuration message carries flow filtering information and flow mapping information; and performing packet filtering and mapping based on the TSN configuration message.

The embodiments of the present application provide a storage medium including computer-executable instructions, where the computer-executable instructions implement not only the preceding method operations but also related operations in the message interaction method according to any embodiment of the present application.

In an exemplary implementation, an embodiment of the present application further provides a storage medium including a computer-executable instruction. When the computer-executable instruction is executed by a computer processor, a message interaction method applied to a second communication node is performed. The method includes determining a Time-Sensitive Networking (TSN) configuration message based on a deterministic requirement; and sending the TSN configuration message to a first communication node, where the TSN message is used for the first communication node to perform packet filtering and mapping.

The embodiments of the present application provide a storage medium including computer-executable instructions, where the computer-executable instructions implement not only the preceding method operations but also related operations in the message interaction method according to any embodiment of the present application.

From the description of the preceding embodiments, it is apparent to those skilled in the art that the present application may be implemented by use of software and necessary general-purpose hardware or may be implemented by hardware. However, in many cases, the former is a preferred implementation. Based on this understanding, the technical solutions of the present application substantially, or the part contributing to the related art, may be embodied in the form of a software product. The computer software product may be stored in a computer-readable storage medium such as a floppy disk, a read-only memory (ROM), a random-access memory (RAM), a flash memory, a hard disk, or an optical disk of a computer and includes multiple instructions for causing a computer device (which may be a personal computer, a server, or a network device) to perform the method in any embodiment of the present application.

The preceding are only example embodiments of the present application and not intended to limit the scope of the present application.

It is to be understood by those skilled in the art that the term "user terminal" covers any suitable type of radio user equipment (UE), for example, a mobile phone, a portable data processing apparatus, a portable web browser, or a vehicle-mounted mobile station.

In general, various embodiments of the present application may be implemented in hardware or special-purpose circuits, software, logics, or any combination thereof. For example, some aspects may be implemented in hardware while other aspects may be implemented in firmware or software executable by a controller, a microprocessor, or another computing apparatus, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable for the local technical environment and may be implemented using any suitable data storage technology, such as, but not limited to, a read-only memory (ROM), a random-access memory (RAM), an optical memory device and system (a digital video disc (DVD) or a compact disc (CD)), and the like. Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. An information interaction method, applied to a first communication node and comprising:
   receiving a Time-Sensitive Networking (TSN) configuration message sent by a second communication node, wherein the TSN configuration message carries flow filtering information and flow mapping information; and
   performing packet filtering and packet mapping based on the TSN configuration message;
   wherein the first communication node is an ingress edge node of a Deterministic Networking (DetNet) domain, or the first communication node is an egress edge node of a DetNet domain;
   wherein when the first communication node is an ingress edge node of a DetNet domain, the flow filtering information comprises a Media Access Control (MAC) mask, wherein the MAC mask is used for identifying and filtering a TSN stream;
   wherein when the first communication node is an egress edge node of a DetNet domain, the flow mapping information comprises at least one of:
   a TSN profile type;
   a TSN profile length; or
   a TSN profile, wherein the TSN profile is used for carrying TSN information.

2. The method of claim 1, wherein when the first communication node is an ingress edge node of a DetNet domain, the flow mapping information comprises a DetNet Flow Identification (Flow-ID), wherein the DetNet Flow-ID uniquely identifies one DetNet flow and is used for identifying the DetNet flow.

3. The method of claim 1, wherein when the first communication node is an ingress edge node of a DetNet domain, the flow mapping information comprises a packet sequence number, wherein the packet sequence number is carried when a set instruction is in a preset state, and the packet sequence number uniquely identifies one DetNet packet and is used for functions of DetNet packet replication and elimination.

4. The method of claim 1, wherein when the first communication node is an ingress edge node of a DetNet domain, performing the packet filtering and the packet mapping based on the TSN configuration message comprises:
   identifying and filtering a TSN packet based on an MAC mask; and
   mapping the filtered TSN packet to a DetNet flow corresponding to the flow mapping information based on the flow mapping information.

5. The method of claim 1, wherein when the first communication node is an egress edge node of a DetNet domain, the flow filtering information comprises a DetNet Flow-ID, wherein the DetNet Flow-ID in the flow filtering information is used for filtering a DetNet flow.

6. The method of claim 1, wherein when the first communication node is an egress edge node of a DetNet domain, performing the packet filtering and the packet mapping based on the TSN configuration message comprises:
   identifying a DetNet packet and filtering the DetNet packet based on a DetNet Flow-ID in the flow filtering information; and
   mapping the filtered DetNet packet to a TSN stream and a TSN profile corresponding to the flow mapping information based on the flow mapping information.

7. A non-transitory storage medium storing a computer program, wherein the computer program, when executed by a processor, causes the processor to perform the method of claim 1.

8. An information interaction method, applied to a second communication node and comprising:
   determining a Time-Sensitive Networking (TSN) configuration message based on a deterministic demand; and
   sending the TSN configuration message to a first communication node, wherein the TSN message is used for the first communication node to perform packet filtering and packet mapping;
   wherein when the first communication node is an ingress edge node of a DetNet domain, flow filtering information carried by the TSN configuration message comprises a Media Access Control (MAC) mask, wherein the MAC mask is used for identifying and filtering a TSN stream;
   wherein when the first communication node is an egress edge node of a DetNet domain, flow mapping information carried by the TSN configuration message comprises at least one of:
   a TSN profile type;
   a TSN profile length; or
   a TSN profile, wherein the TSN profile is used for carrying TSN information.

9. The method of claim 8, wherein the second communication node is a controller.

10. The method of claim 8, wherein a protocol type of the TSN configuration message comprises at least one of:
    when a Border Gateway Protocol (BGP) flow is configured, the protocol type of the TSN configuration message is a BGP; or
    when a Path Computation Element Protocol (PCEP) flow is configured, the protocol type of the TSN configuration message is a PCEP.

11. The method of claim 8, wherein when the first communication node is an ingress edge node of a Deterministic Networking (DetNet) domain, flow mapping information carried by the TSN configuration message comprises a DetNet Flow Identification (Flow-ID) and a packet sequence number.

12. The method of claim 8, wherein when the first communication node is an egress edge node of a DetNet domain, flow filtering information carried by the TSN configuration message comprises a DetNet Flow-ID.

13. A device, comprising:
   at least one processor; and
   a memory configured to store at least one program,
      wherein the at least one program, when executed by the at least one processor, causes the at least one processor to perform the method of claim 8.

14. A non-transitory storage medium storing a computer program, wherein the computer program, when executed by a processor, causes the processor to perform the method of claim 8.

15. A device, comprising:
   at least one processor; and
   a memory configured to store at least one program,
      wherein the at least one program, when executed by the at least one processor, causes the at least one processor to perform:
         receiving a Time-Sensitive Networking (TSN) configuration message sent by a second communication node, wherein the TSN configuration message carries flow filtering information and flow mapping information; and
         performing packet filtering and packet mapping based on the TSN configuration message;
      wherein the first communication node is an ingress edge node of a Deterministic Networking (DetNet) domain, or the first communication node is an egress edge node of a DetNet domain;
      wherein when the first communication node is an ingress edge node of a DetNet domain, the flow filtering information comprises a Media Access Control (MAC) mask, wherein the MAC mask is used for identifying and filtering a TSN stream;
      wherein when the first communication node is an egress edge node of a DetNet domain, the flow mapping information comprises at least one of:
         a TSN profile type;
         a TSN profile length; or
         a TSN profile, wherein the TSN profile is used for carrying TSN information.

* * * * *